United States Patent [19]

Uekama

[11] Patent Number: 5,347,565
[45] Date of Patent: Sep. 13, 1994

[54] ORDER WIRE DEVICE HAVING FUNCTION FOR REDUCING NOISE IN COMMUNICATION SYSTEM HAVING A PLURALITY OF ORDER WIRE DEVICES

[75] Inventor: Kimio Uekama, Kawasaki, Japan

[73] Assignee: Fujitsu Limited, Kawasaki, Japan

[21] Appl. No.: 894,367

[22] Filed: Jun. 4, 1992

[30] Foreign Application Priority Data

Jun. 6, 1991 [JP] Japan .................. 3-135143

[51] Int. Cl.⁵ .............. H04M 1/24; H04M 1/00; H04J 3/06; G05B 23/02
[52] U.S. Cl. ................... 379/12; 379/338; 370/100.1; 340/825.2; 340/825.08
[58] Field of Search .......... 379/1, 9, 12, 14, 27, 379/34, 63, 350, 351, 338; 370/55, 112, 119; 455/58.2; 340/825.02, 825.08, 825.52

[56] References Cited

FOREIGN PATENT DOCUMENTS 147947 9/1989 Japan .

*Primary Examiner*—Stephen Chin
*Assistant Examiner*—Kevin Kim

[57] ABSTRACT

An order wire device in a communication system having a plurality of order wire devices, signals output from each of the order wire devices being serially transmitted to remaining order wire devices, each of the order wire devices being capable of simultaneously calling remaining order wire devices in an all station calling mode. The order wire device includes, a tone ringer circuit for outputting a ring-back-tone signal, a first detection circuit for detecting a request for a call in the all station calling mode, a first control circuit for activating the tone ringer circuit when the first detection circuit detects the request, a second control circuit for inactivating the tone ringer circuit when an off-hook operation is carried out in response to the request, a signal output circuit for outputting a stop signal when the first detection circuit detects the request and the off-hook operation is carried out, a second detection circuit for detecting a stop signal output from an order wire device in which the off-hook operation has been carried out, and a third control circuit for inactivating the tone ringer circuit when the first detection circuit detects the requirement and the second detection circuit detects the stop signal.

9 Claims, 5 Drawing Sheets

ORDER WIRE DEVICE HAVING FUNCTION FOR REDUCING NOISE IN COMMUNICATION SYSTEM HAVING A PLURALITY OF ORDER WIRE DEVICES

BACKGROUND OF THE INVENTION

1. Field of the Invention

The present invention generally relates to an order wire device in a communication system, and more particularly to an order wire device having a function for reducing noises caused by ring-back-tones generated from called order wire devices in a communication system, such as an optical communication system.

2. Description of Related Art

In an optical communication network system as shown in FIG. 1, stations ST1, ST2, ST3 and ST4 are coupled to each other by optical fiber cables, and subscriber terminals (not shown) are connected to each station having a switching function. High-speed digital communication is carried out between subscriber terminals via the stations. Order wire devices OW1, OW2, OW3 and OW4 are respectively connected to the stations ST1, ST2, ST3 and ST4. An administrator of each station uses an order wire device for communicating information required for maintenance to an administrator of another station. In calling between order wire devices, it is desired that noise interfering with signals be reduced.

In the optical communication network system as shown in FIG. 1, signals output from each of the order wire devices OW1, OW2, OW3 and OW4 are superposed, as supplementary signals, on main signals transmitted among the stations ST1, ST2, ST3 and ST4. The communication between the order wire devices is carried out based on the supplementary signals superposed on the main signals.

When an order wire device is called by an order wire device connected to another station, the called order wire device determines whether or not a station number supplied from the calling order wire device is equal to that identifying the called order wire device. When the station number supplied from the calling order wire device is equal to that identifying the called order wire device, the called order wire device outputs a ring-back-tone signal for a predetermined time. An administrator lifts a phone receiver of the called order wire device, so that an off-hook operation of the called order wire device is carried out. Then the called order wire device stops output of the ring-back-tone signal. After this, a communication is established between the calling order wire device and the called order wire device.

There are two modes for calling order wire devices. The first mode is referred to as a single station calling mode. In the single station calling mode, an order wire device can call only one order wire device. The second mode is referred to as an all station calling mode. In the all station calling mode, an order wire device can simultaneously call all order wire devices provided in the communication system.

FIGS. 2A and 2B show the all station calling mode in the communication system having four order wire devices OW1, OW2, OW3 and OW4.

Referring to FIG.2A, a first order wire device OW1 calls other order wire devices OW2, OW3 and OW4 in accordance with the all station calling mode. When the order wire devices OW2, OW3 and OW4 determine that they are being called in accordance with the all station calling mode, the order wire devices OW2, OW3 and OW4 output ring-back-tone (RBT) signals. An RBT signal output from the second order wire device OW2 is transmitted to the first order wire device OW1 via two stations respectively connected to the second and first order wire devices OW2 and OW1. An RBT signal output from the third order wire device OW3 is transmitted to the first order wire device OW1 via three stations respectively connected to the third, second and first order wire devices OW3, OW2 and OW1. An RBT signal output from the fourth order wire device OW4 is transmitted to the first order device OW1 via four stations respectively connected to fourth, third, second and first order wire devices OW4, OW3, OW2 and OW1.

Conventionally, when an off-hook of one of the order wire devices OW2, OW3 and OW4, for example, the second order wire device OW2, is carried out, the order wire devices OW2, OW3 and OW4 assume states shown in FIG. 2B. That is, the second order wire device OW2 stops output of the RBT signal, but the remaining order wire devices OW3 and OW4 continuously output the RBT signals for a predetermined time. In this state, the RBT signals output by the third and fourth order wire devices OW3 and OW4 are superposed, as noise, on sound signals in the call between the first and the second order wire devices OW1 and OW2. Thus, the quality of the sound signals in the call between the first and second order wire devices OW1 and OW2 deteriorates.

SUMMARY OF THE INVENTION

Accordingly, a general object of the present invention is to provide a novel and useful order wire device in a communication system in which the disadvantages of the aforementioned prior art are eliminated.

A more specific object of the present invention is to provide an order wire device in a communication system capable of preventing ring-back-tone signals from being superposed, as noises, on sound signals during a calling process between order wire devices when order wire devices in a communication system are operated in accordance with an all station calling mode.

The above objects of the present invention are achieved by an order wire device in a communication system having a plurality of order wire devices, signals output from each of the order wire devices being serially transmitted to remaining order wire devices, each of the order wire devices being capable of simultaneously calling remaining order wire devices in a predetermined mode, the order wire device comprising: first signal output means for outputting a ring-back-tone signal; detection means for detecting a request for a call in the predetermined mode; first control means, coupled to the first signal output means and the detection means, for activating the first signal output means when the detection means detects the requirement; second control means, coupled to the first signal output means, for inactivating the first signal output means when an off-hook operation which is an operation enabling communication with a calling order wire device is carried out in response to the request; second signal output means, coupled to the first detection means, for outputting a stop signal when the first detection means detects the requirement and the off-hook operation is carried out; said detection means also detecting a stop signal output from an order wire device in which the off-hook operation has been carried out; and third control means, coupled to the first signal output means, the detection means, for inactivating the first signal output means when the detection means detects the request and the stop signal.

According to the present invention, the first signal output means is inactivated when the detection means detects the stop signal. Thus, the ring-back-tone signal is prevented from being superposed, as noise, on sound signals transmitted between order wire devices in the all station calling mode. That is, the quality of the sound signals in the communication system can be improved.

Additional objects, features and advantages of the present invention will become apparent from the following detailed description when read in conjunction with the accompanying drawings.

DESCRIPTION OF THE PREFERRED EMBODIMENTS

A description will now be given, with reference to FIG. 3, of the principle of an embodiment of the present invention.

Figure 3:
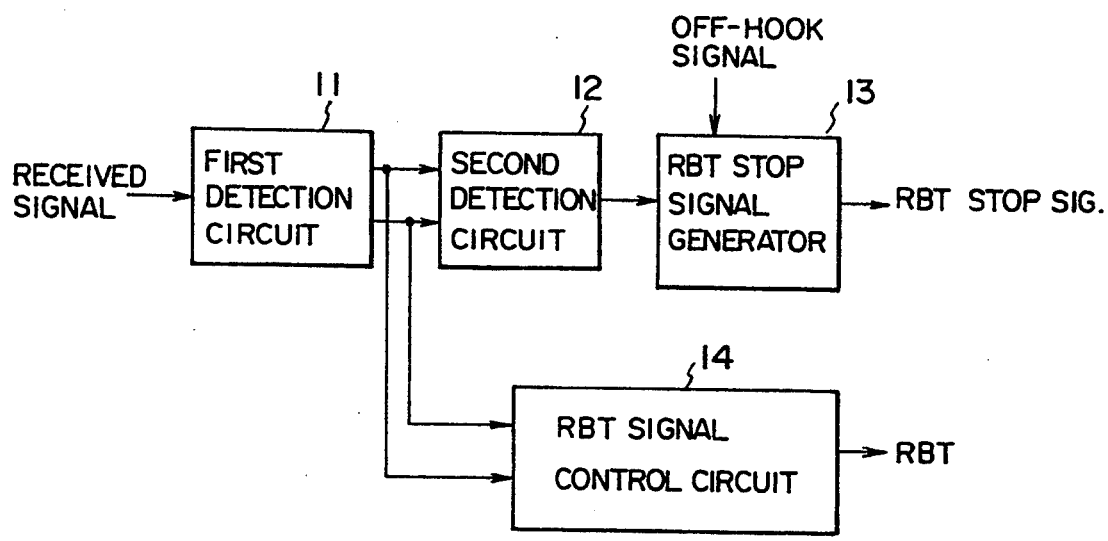
FIG. 3 is a block diagram illustrating the principle of an embodiment of the present invention.

Each of order wire devices in a communication system has elements shown in FIG. 3. Referring to FIG. 3, a first detection circuit 11 receives signals supplied from a station connected thereto. The first detection circuit 11 detects an all station calling signal in the received signals. The all station calling signal represents a request for an operation in the all station calling mode. The first detection circuit 11 also detects a ring back tone stop signal (an RBT stop signal) in the received signals. The RBT stop signal represents a request to stop output of the RBT signal. A second detection circuit 12 outputs a control signal when the first detection circuit 11 detects the all station calling signal and does not detect the RBT stop signal. The second detection circuit 12 supplies the control signal to an RBT stop signal generator 13. The RBT stop signal generator 13 outputs an RBT stop signal when an off-hook signal is received under a condition in which the RBT stop signal generator 13 receives the control signal. The off-hook signal is supplied when an off-hook operation of this order wire device is carried out. An RBT signal control circuit 14 outputs an RBT signal when the first detection circuit 11 detects the all station calling signal and does not detect the RBT stop signal. When the first detection circuit 11 detects both the all station calling signal and the RBT stop signal, the RBT signal control circuit 14 stops output of the RBT signal.

One of the order wire devices in a communication system outputs the all station calling signal, and calls other order wire devices. In each of the called order wire devices, as the first detection circuit 11 detects the all station calling signal, the RBT signal-control circuit 14 outputs an RBT signal. When, in one of the called order wire devices, an off-hook operation is carried out, the RBT stop signal generator 13 therein outputs an RBT stop signal, and the RBT signal control circuit 14 stops to output the RBT signal. In one of other called order wire devices outputting the RBT signals, when the first detection circuit 11 further inputs the RBT stop signal transmitted from an order wire device in which the off-hook operation is carried out, the RBT signal control circuit 14 stops output of the RBT signal. At this time, the RBT stop signal generator 13 does not output an RBT stop signal.

In the communication system provided with order wire devices each having the above structure, when the off-hook operation of one of the called order wire devices is carried out in the all station calling mode, all called order wire devices stop outputting the RBT signals.

A description will now be given, with reference to FIGS. 4 through 6, of the embodiment corresponding to the principle described above.

Figure 1:
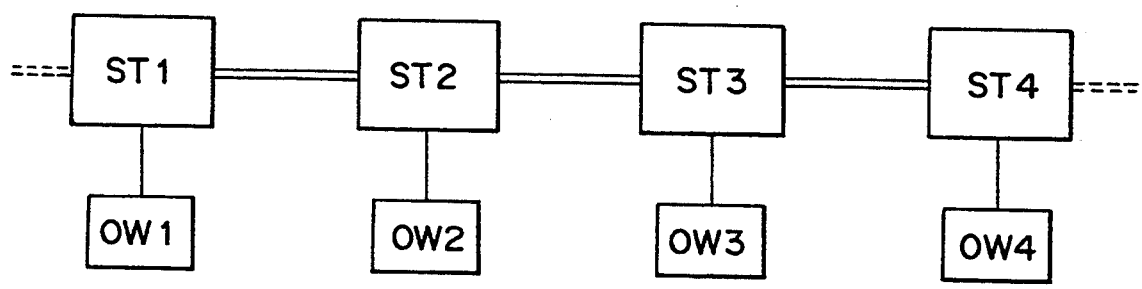
FIG. 1 is a block diagram illustrating an optical communication system having a plurality of order wire devices.
Figures 2A, 2B:
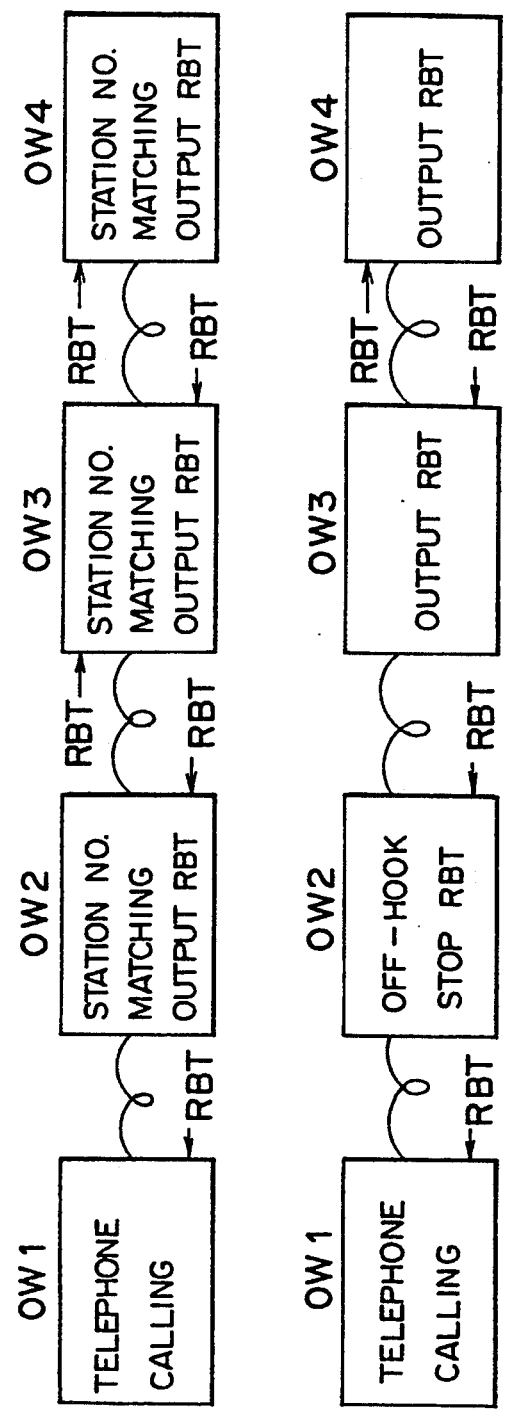
FIGS. 2A and 2B are block diagrams illustrating operations of the order wire devices in accordance with an all station calling mode.
Figure 4:
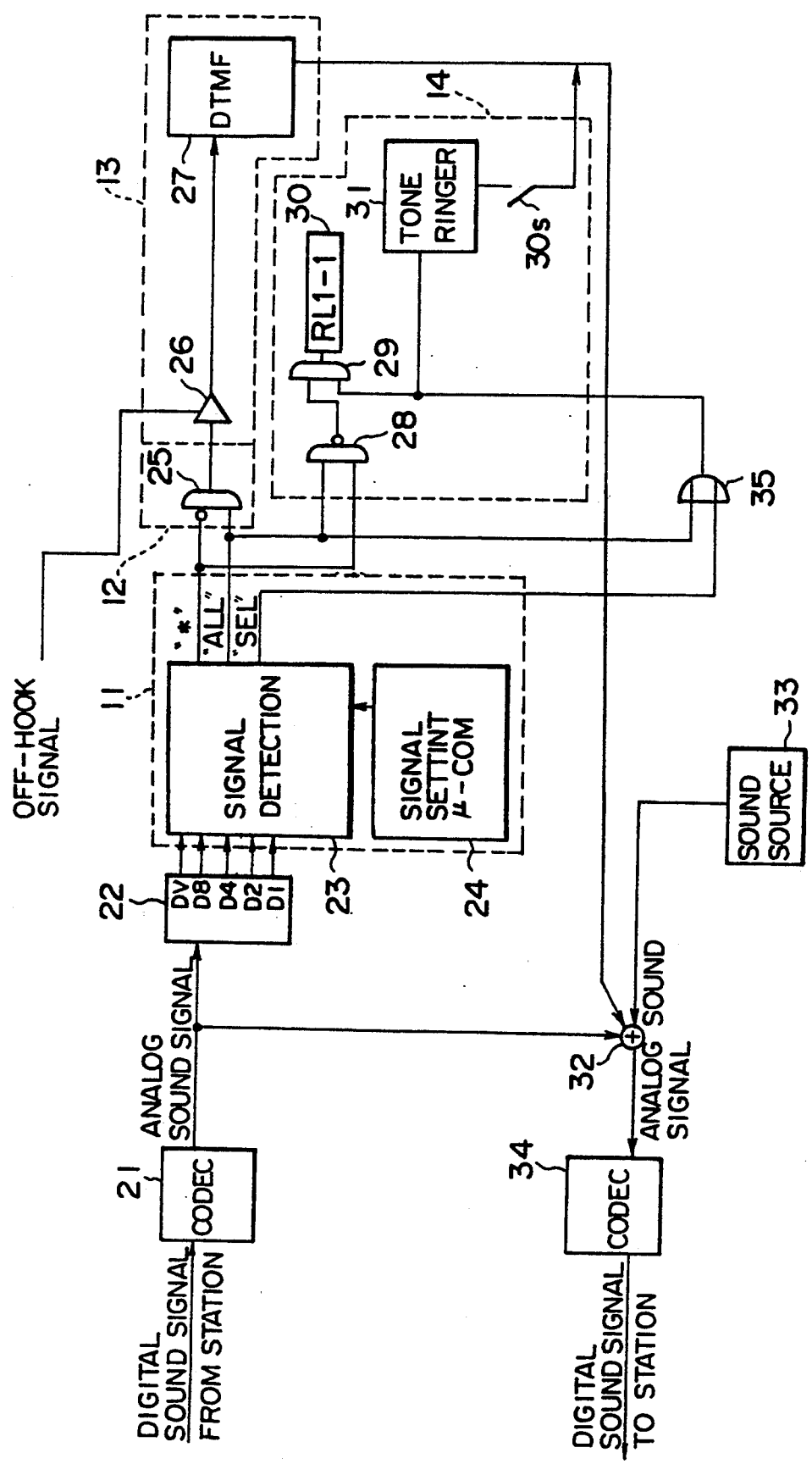
FIG. 4 is a diagram illustrating an order wire device provided with a noise canceling unit according to an embodiment of the present invention.

FIG. 4 shows a structure of each of order wire devices in a communication system. In the communication system, the order wire devices are coupled to a plurality of stations as shown in FIG. 1. In FIG. 4, those parts which are the same as those shown in FIG. 3 are given the same reference numbers.

Referring to FIG. 4, a digital sound signal is supplied from a station to a CODEC 21. The CODEC 21 is a circuit for converting a digital sound signal into an analog sound signal and vise versa. The CODEC 21 is made of a known integrated circuit device, such as an MB6034 manufactured by FUJISTU CO., LTD. The analog sound signal output from the CODEC 21 is supplied to a phone receiver (not shown) and a dual tone multiple frequency (DTMF) receiver 22. The DTMF receiver 22 converts signals representing the all station calling mode and a station number and an RBT stop signal into digital signal. The DTMF is made of a known integrated circuit device, such as an MC145436 manufactured by MOTOROLA CO., LTD. The digital signal output from the DTMF 22 is supplied to a signal detection circuit 23. The signal detection circuit 23 is connected to a signal setting u-COM circuit 24. A digital reference signal representing the all station calling mode and a digital reference signal corresponding to the RBT stop signal has been previously set in the signal setting u-COM circuit 24. The signal detection circuit 23 compares the digital signal supplied from the DTMF 22 with the reference signals set in the signal setting u-COM circuit 24 in order to detect a request for the all station calling mode and the RBT stop signal. The signal detection circuit 23 outputs three control signals; a first control signal (*), a second control signal (ALL) and third control signal (SEL). When the RBT stop signal is detected, the signal detection circuit 23 activates the first control signal (*) (e.i. a high level). When the request for the all station calling mode is detected, the signal detection circuit 23 activates the second control signal (ALL). When the request for the single station calling mode is detected, the signal detection circuit 23 activates the third control signal (SEL). The set of the signal detection circuit 23 and the signal setting u-COM circuit 24 corresponds to the first detection circuit 11 shown in FIG. 3, and can be integrated into one IC device.

The first control signal (*) is inverted and input to an AND gate 25, and the second control signal (ALL) is input to the AND gate 25 also. The AND gate 25 corresponds to the second detection circuit 12 shown in FIG. 3. An output signal from the AND gate 25 is supplied to a DTMF sender 27 via a tristate circuit 26 having a control terminal. An off-hook signal activated when an off-hook operation of this order wire device is carried out is supplied to the control terminal of the tristate circuit 26. When the off-hook signal is activated, the tristate circuit 26 is opened so that the output signal of the AND gate 25 passes through the tristate circuit 26 and is input to the DTMF sender 27. The DTMF sender 27 outputs an RBT (ring-back-tone) stop signal when an activated signal is input thereto. The DTMF sender 27 is made of a known IC device, such as a TC35218F manufactured by TOSHIBA CO., LTD. The set of the tristate circuit 26 and the DTMF sender 27 corresponds to the RBT signal stop circuit 13 shown in FIG. 3.

The first control signal (*) and the second control signal (ALL) are also supplied to a NAND gate 28 having two input ports. The second control signal (ALL) and the third control signal (SEL) are supplied to an OR gate 35 having two input ports. Output signals of the NAND gate 28 and the OR gate 33 are supplied to an AND gate 29 having two input ports. A relay driving circuit 30 is controlled based on a control signal output from the AND gate 29. When the control signal output from the AND gate 29 is activated, the relay driving circuit 30 drives a relay (not shown) so that a relay contact 30s is closed. On the other hand, when the control signal supplied to the relay driving circuit 30 is inactivated (e.i. at a low level), the relay driving circuit 30 drives the relay so that the relay contact 30s is opened. The output signal from the OR gate 35 is input to a tone ringer circuit 31. When the output signal from the OR gate 35 is activated, the tone ringer circuit 31 outputs an RBT signal that is an audible signal. The relay driving circuit 30 is also controlled based on the off-hook signal. When the off-hook signal is activated, the relay driving circuit 30 drives the relay so that the relay contact 30s is opened. The tone ringer circuit 31 is made of a known IC, such as a TA31001F manufactured by TOSHIBA CO., LTD. The set of the NAND gate 28, the AND gate 29, the relay driving circuit 30, the relay including the relay contact 30s, and the tone ringer circuit 30s corresponds to the RBT signal control circuit 14 shown in FIG. 3.

An output terminal of the tone ringer circuit 31 is coupled to an input terminal of an adder circuit 32 via the relay contact 30s. An output terminal of the DTMF sender 27 is connected to an input terminal of the adder circuit 32. Further, sound signals output from a sound source 33 of the phone receiver are supplied to the adder circuit 32. The adder circuit 32 outputs an analog signal in which the RBT signal or the RBT stop signal is superposed on the sound signals. The analog signal output from the adder circuit 32 is converted into a digital signal by a CODEC 34 having the same structure as the CODEC 21. Then the digital signal is supplied to a station coupled to this order wire device. The digital signal is optically transmitted to other stations via the optical fiber cables.

The analog sound signal output from the CODEC 21 is supplied to the adder circuit 32, so that signals generated in an order wire device can be successively transmitted to other order wire devices via the stations.

Figure 6:
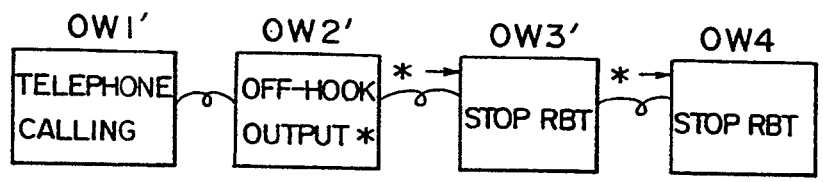
FIG. 6 is a block diagram illustrating operations of the order wire devices in accordance with the all station calling mode, each order wire device having a structure shown in FIG. 4.

Operations in a case involving four order wire devices OW1', OW2', OW3' and OW4', as shown in FIG. 6, will be described below.

A first order wire device OW1' calls other order wire devices OW2', OW3' and OW4' in the all station calling mode. In each of the called order wire devices OW2', OW3, and OW4, when the signal representing the requirement of the all station calling mode is detected by the signal detection circuit 23, the second control signal (ALL) output from the signal detection circuit 23 is activated. At this time, as the first control signal (*) is not active, based on the control signal output from the AND gate 29, the relay driving circuit 30 drives the relay so that the relay contact 30c is closed. Then, as the activated second control signal (ALL) is supplied to the tone ringer circuit 31 via the OR gate 35, the tone ringer circuit 31 outputs the RBT signal. Thus, the RBT signal output from the tone ringer circuit 31 is supplied to the CODEC 34 via the adder circuit 32, and the RBT signal processed by the CODEC 34 is successively transmitted to the stations via the optical fiber cables.

Figure 5A:
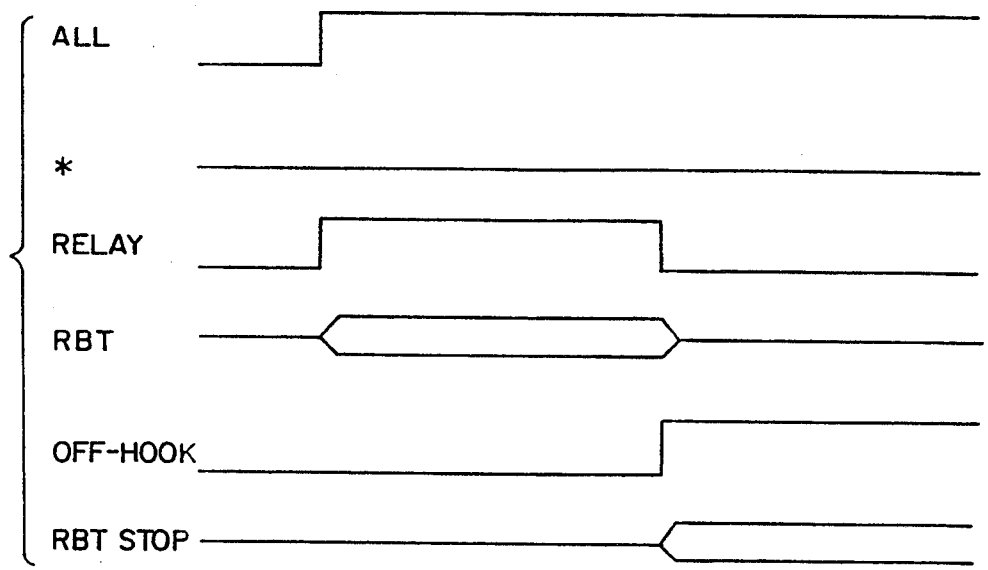
FIGS. 5A and 5B are timing charts illustrating operations of the order wire device shown in FIG. 4.

In this state, an off-hook operation is carried out in a second order wire device OW2' first. The second order wire device OW2' operates in accordance with a timing chart shown in FIG. 5A. Referring to FIG. 5A, the relay contract 30 is closed based on the activated second control signal (ALL), so that the second order wire device OW2' outputs the RBT signal. When the off-hook signal is activated based of the off-hook operation, the relay is driven by the relay driving circuit 30 so that the relay contact 30c is opened. Thus, the second order wire device OW2' stops to output the RBT signal. At this time, the first control signal (*) is inactive and the second control signal (ALL) is in active, so that the output signal of the AND gate 25 is active. The tristate circuit 26 is opened by the activated off-hook signal, and the activated output signal of the AND gate 25 is supplied to the DTMF sender 27. Thus, the RBT stop signal is output from the DTMF sender 27 and supplied to the CODEC 34 via the adder circuit 32. The RBT stop signal processed by the CODEC 34 is successively supplied to the stations via the optical fiber cables.

After the off-hook operation in the second order wire device OW2', the communication between the first and second order wire devices OW1' and OW2' can be performed. In each of the first and second order wire devices OW1' and OW2', the analog sound signal output from the CODEC 21 is supplied to the phone receiver and to the adder circuit 32. Then a sound signal output from the sound source 33 of the phone receiver is superposed on the sound signal supplied from the CODEC 21 by the adder circuit 32. The signal output from the adder circuit 32 is converted into a digital signal by the CODEC 34, and transmitted to the stations.

Figure 5B:
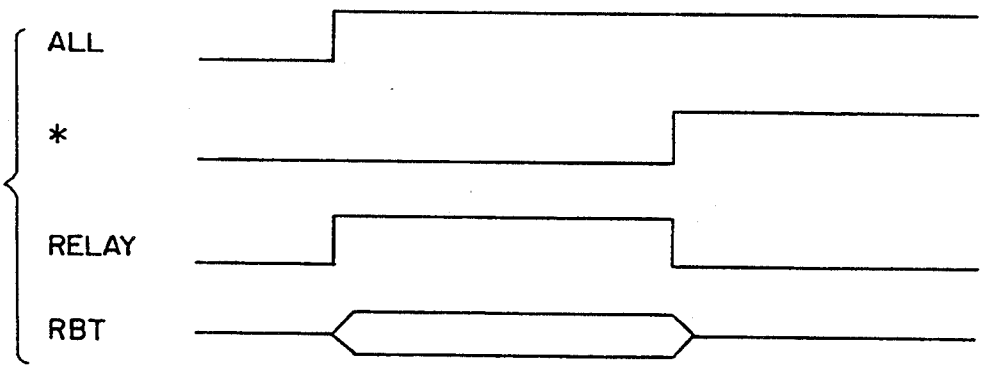

Third and fourth order wire devices OW3', and OW4' receive the RBT stop signal transmitted from the second order wire device OW2'. Each of the third and fourth order wire devices OW3' and OW4' operates in accordance with a timing chart shown in FIG. 5B. Referring to FIG. 5B, the relay contract 30 is closed based on the activated second control signal (ALL), so that each of the order wire devices OW3' and OW4' outputs the RBT signal. When each of the order wire devices OW3' and OW4' receives the RBT stop signal transmitted from the second order wire device OW2', the signal detection circuit 23 detects the RBT stop signal. Then the first control signal (*) output from the signal detection circuit 23 is activated. In this case, both the first and second signals (*) and (ALL) are active. Thus, the output signal of the NAND gate 28 becomes a low level, and the control signal output of the AND gate 29 is inactivated. In this case, the relay driving circuit 30 drives the relay so that the relay contact 30c is opened. As a result, each of the order wire devices OW3' and OW4' stops output of the RBT signal.

As has been described above, the third and fourth order wire devices OW3' and OW4' stop to output the RBT signals based on the RBT stop signal generated by the second order wire device OW2' in which the off-hook operation is carried out. Thus, the RBT signals are not superposed, as noises, on the sound signals transmitted between the first and second order wire devices OW1' and OW2'. That is, the quality of the sound signals transmitted between order wire devices communicating with each other can be improved.

For example, in a case where the first order wire device OW1' calls the second order wire device OW2', the first order device OW1' outputs a signal representing a requirement of the single station calling mode and a station number for identifying the second order wire device OW2'. In the second order wire device OW2', when the signal detection circuit 23 determines that the station number supplied from the first order wire device OW1' is equal to the reference station number set in the signal setting u-COM circuit 24, the third control signal (SEL) output from the signal detection circuit 23 is activated. Due to the activated third control signal (SEL), the relay driving circuit 30 drives the relay so that the relay contact 30s is closed and the tone ringer circuit 31 outputs the RBT signal. Thus, the second order wire device OW2' outputs the RBT signal. After that, when the off-hook operation is carried out in the second order wire device OW2', the relay contact is opened, so that the second order wire device OW2' stops output of the RBT signal. Then the communication between the first and second order wire devices OW1' and OW2' can be performed.

The present invention is not limited to the aforementioned embodiments, and variations and modifications may be made without departing from the scope of the claimed invention.

What is claimed is:

1. An order wire device in a communication system having a plurality of order wire devices, signals output from each of said order wire devices being serially transmitted to remaining order wire devices, each of said order wire devices being capable of simultaneously calling remaining order wire devices in an all station calling mode, said order wire device comprising:
   first signal output means for outputting a ring-back-tone signal;
   detection means for detecting a request for a call in said all station calling mode;
   first control means, operatively coupled to said first signal output means and said detection means, for activating said first signal output means when said detection means detects said request;
   second control means, operatively coupled to said first signal output means, for inactivating said first signal output means when an off-hook operation which is an operation enabling communication with a calling order wire device is carried out in response to said request;
   second signal output means, operatively coupled to said detection means, for outputting a stop signal when said detection means detects said request and the off-hook operation has been carried out; and
   said detection means also detecting a stop signal output from another order wire device in which the off-hook operation has been carried out;
   said second control means being operatively coupled to said detection means for inactivating said first signal output means when said detection means detects said request and the stop signal.

2. A device as claimed in claim 1, wherein said detection means includes storage means for storing a first reference signal corresponding to the request of the call in said all station calling mode, and determining means for determining, based on the first reference signal stored in said first storage means, whether or not a signal representing the request of the call in said all station calling mode is included in received signals, said determining means outputting a first control signal which is activated when said determining means determines that the signal representing the request is included in the received signals.

3. A device as claimed in claim 1, wherein said detection means includes storage means for storing a second reference signal corresponding to the stop signal, and determining means for determining, based on the second reference signal stored in said storage means, whether or not the stop signal is included in the received signals, said determining means outputting a second control signal which is activated when said determining means determines that the stop signal is included in the received signals.

4. A device as claimed in claim 1, wherein said detection means is formed as an integrated circuit device.

5. A device as claimed in claim 1, wherein said detection means comprises:
   storage means for storing a first reference signal corresponding to the request for the call in said all station calling mode; and
   determining means for determining, based on the first reference signal stored in said storage means, whether or not a signal representing the request for the call in said all station calling mode is included in received signals to output a first control signal which is activated when said determining means determines that the signal representing the request is included in the received signals;
   said storage means also storing a second reference signal corresponding to the stop signal and
   said determining means also determining, based on the second reference signal stored in said storage means, whether or not the stop signal is included in the received signals to output a second control signal which is activated when said determining means determines that the stop signal is included in the received signals.

6. A device as claimed in claim 5, wherein said second signal output means comprises:
   signal generating means for generating the stop signal;
   a detecting circuit, to which the first and second control signals are respectively supplied from said determining means, for outputting a detection signal, said detection signal being active when the first control means is active and the second control means is inactive; and supplying means for supplying the detection signal output from said detecting circuit to said signal generating means when the off-hook operation means is carried out, and wherein said signal generating means generates the stop signal when the detection signal is supplied thereto.

7. A device as claimed in claim 6, wherein said detecting circuit has an AND gate to which the first control signal and the inverted second control signal are input, an output signal of said AND gate is used as the detection signal.

8. A device as claimed in claim 5, wherein said second control means comprises:

a gate circuit, to which the first and second control signals respectively supplied from said determining means are input, for outputting a driving signal, said driving signal being inactive when the first and second control signals are active;

a switch circuit, to which the driving signal is supplied from said gate circuit, for preventing said first signal output means from outputting the ring-back-tone signal when the driving signal is inactive.

9. A device as claimed in claim 8, wherein said switch circuit has a relay circuit coupled to said first signal output means, said relay circuit being turned off when the driving signal is inactive, so that said first signal output means is prevented from outputting the ring-back-tone signal.

* * * * *